(12) United States Patent
Posser et al.

(10) Patent No.: US 10,460,066 B1
(45) Date of Patent: Oct. 29, 2019

(54) ROUTING FRAMEWORK TO RESOLVE SINGLE-ENTRY CONSTRAINT VIOLATIONS FOR INTEGRATED CIRCUIT DESIGNS

(71) Applicant: Cadence Design Systems, Inc., San Jose, CA (US)

(72) Inventors: Gracieli Posser, Austin, TX (US); Wen-Hao Liu, Cedar Park, TX (US); Wing-Kai Chow, Austin, TX (US); Mehmet Can Yildiz, Austin, TX (US); Zhuo Li, Austin, TX (US)

(73) Assignee: Cadence Design Systems, Inc., San Jose, CA (US)

(*) Notice: Subject to any disclaimer, the term of this patent is extended or adjusted under 35 U.S.C. 154(b) by 203 days.

(21) Appl. No.: 15/649,443

(22) Filed: Jul. 13, 2017

(51) Int. Cl.
*G06F 17/50* (2006.01)

(52) U.S. Cl.
CPC ...... *G06F 17/5077* (2013.01); *G06F 2217/06* (2013.01)

(58) Field of Classification Search
USPC ........................................................ 716/131
See application file for complete search history.

(56) References Cited

U.S. PATENT DOCUMENTS 5,818,729 A * 10/1998 Wang ................. G06F 17/5072
716/122
2013/0272126 A1 * 10/2013 Alpert .................. H04L 41/145
370/235

* cited by examiner

*Primary Examiner* — Eric D Lee
(74) *Attorney, Agent, or Firm* — Schwegman Lundberg & Woessner, P.A.

(57) ABSTRACT

Aspects of the present disclosure address improved systems and methods for resolving single-entry constraint violations in hierarchical integrated circuit designs. In routing multi-pin nets of IC designs, the system employs a partition-entry-aware search algorithm to identify single-entry-violation-free routing results for two-pin nets, which are then combined to form routed multi-pin nets. The search algorithm is "entry-aware" in that it penalizes multiple entries into a single partition. Consistent with some embodiments, the system may further employ a post fix stage to remove extra partition entries for the multi-pin nets with single-entry violations by choosing a main entry to enter a partition and rerouting the paths that cause the violations such that the paths share the main entry.

20 Claims, 10 Drawing Sheets

| | Top | Pa | Pb | Pc | Pd |
|---|---|---|---|---|---|
| Top | 0 | 1 | 1 | 1 | 2 |
| Pa | 1 | 0 | 2 | 2 | 3 |
| Pb | 1 | 2 | 0 | 2 | 3 |
| Pc | 1 | 2 | 2 | 0 | 1 |
| Pd | 2 | 3 | 3 | 1 | 0 |

(d)

US 10,460,066 B1

ROUTING FRAMEWORK TO RESOLVE SINGLE-ENTRY CONSTRAINT VIOLATIONS FOR INTEGRATED CIRCUIT DESIGNS

TECHNICAL FIELD

The present disclosure generally relates to the technical field of integrated circuit design. In particular, the present disclosure addresses systems and methods for fixing single-entry constraints for hierarchical integrated circuit designs.

BACKGROUND

An integrated circuit (IC) comprises cells of similar and/or various sizes, and connections between or among the cells. A cell includes several pins interconnected by wires to pins of one or more other cells. A net includes a set of pins connected by wires in order to form connections between or among the pins. An IC may include a set of nets. A design netlist specifies the connections between the pins.

Design engineers design IC's by transforming circuit descriptions of the IC's into geometric descriptions, called layouts. To create layouts, design engineers typically use electronic design automation (EDA) applications. These applications provide sets of computer-based tools for creating, editing, and analyzing IC design layouts.

EDA applications create layouts by using geometric shapes that represent different materials and devices on IC's. For instance, EDA tools commonly use rectilinear lines to represent the wire segments that interconnect the IC components. These tools also represent electronic and circuit IC components as geometric objects with varying shapes and sizes.

The IC design process entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnects between or among the circuit components; and (5) verification, which checks the layout to ensure that it meets design and functional requirements.

Routing is a key operation in the physical design cycle. It is generally divided into two phases: global routing and detailed routing. For each net, global routing generates a routing topology that includes an approximate routing path for the interconnect lines that are to connect the pins of the net. After the routing topology has been created, detailed routing creates specific individual routes for each net.

Due to the large number of nets in the netlist, it typically takes a long time for conventional routers to finish the connection task. In addition, the connections may be too numerous and/or overcrowded, such that conventional routers fail to finish the routing, particularly generating interconnections, without violating one or more routing constraints (e.g., design-rule constraints and performance constraints). For example, a hierarchical IC design may include one or more partitions and a routing constraint that limits the routing path of nets in the design to only a single entry into each partition (e.g., a routing path may intersect with partition boundaries only once) to reduce design, device, and manufacturing costs. However, conventional routing methods are generally not partition aware, and as such, cannot guarantee a single-entry-violation-free routing result. In other words, the conventional routing methods result in routing topologies that may have multiple entries to a single partition thereby creating a violation to the single-entry constraint.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In many instances, IC designs include a number of independently designed sub-circuits or subsystems known as "partitions" that are designed to speed up the design process by minimizing the number of interconnections. One of ordinary skill in the art may also refer to these regions as "blocks," "random logic macros," or simply as "macros." As noted above, hierarchical IC designs may include a routing constraint that limits the routing path of nets in the design to only a single entry into each partition (e.g., a routing path may intersect with partitions only once) to reduce design, device, and manufacturing costs. A partition entry, as used herein, includes an instance in which a routing path traverses (e.g., crosses) a partition boundary. Conventional routing methods are generally not partition aware, and as such, cannot guarantee a single-entry-violation-free routing result.

Accordingly, aspects of the present disclosure address systems and methods for resolving single entry constraints in IC designs. The system employs an entry-aware search algorithm based on a modified A* search algorithm to identify single-entry-violation-free routing results for two-pin nets. For example, given a hierarchical IC design as input, the system decomposes multi-pin nets in the design into two-pin nets. During the routing process, the system applies the entry-aware search algorithm to generate single-entry-violation-free routing results for each two-pin net. The search algorithm is "entry-aware" in that it penalizes multiple entries into a single partition (e.g., using an adjustment factor). The system assembles the multi-pin net by combining the routed two-pin nets to assemble the multi-pin net.

Although the individual two-pin nets are routed in a manner that does not violate the single-entry constraint, the single-entry constraint may be violated in the routed multi-pin net as a result of combining the two-pin nets. Accordingly, consistent with some embodiments, the system may utilize a post fix stage to remove extra entries for the multi-pin nets with single-entry violations by choosing a main entry to enter a partition and rerouting the paths that enter the partition at a location other than the main entry such that the paths share the main entry.

Figure 1:
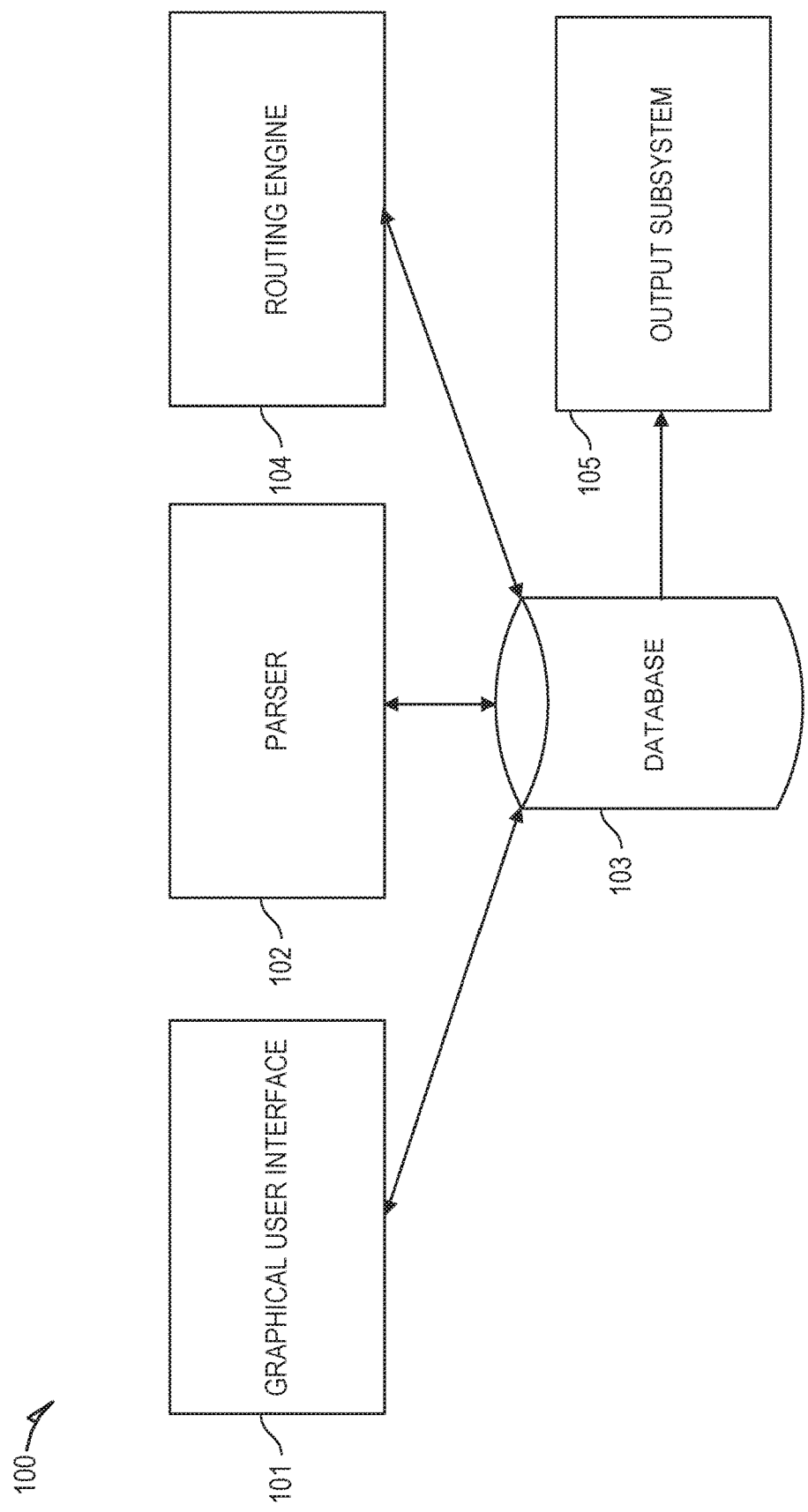
FIG. 1 is a block diagram illustrating a router system, according to some example embodiments.

With reference to FIG. 1, a router 100 is illustrated, according to some example embodiments. The router 100 comprises a graphical user interface (GUI) 101, a parser 102, a database 103, a routing engine 104, and an output subsystem 105. Any one or more of the functional components illustrated in FIG. 1 and described herein may be implemented using hardware (e.g., a processor of a machine) or a combination of hardware and software. For example, any one of the components described herein may configure a processor to perform the operations described herein for that component. Moreover, any two or more of these components may be combined into a single component, and the functions described herein for a single component may be subdivided among multiple components. Furthermore, according to various example embodiments, any of the functional components illustrated in FIG. 1 may be implemented together or separately within a single machine, database, or device or may be distributed across multiple machines, databases, or devices.

The GUI 101 is responsible for handling user interactions with the router 100. For example, the GUI 101 may allow a user to view wires generated by the router 100. The GUI 101 may also allow the user to view various information, such as routing tracks. The GUI 101 may also allow the user to interactively add and delete wires.

The parser 102 reads in IC design information stored in a format, such as an industry standard format and/or a custom format. The cells and connections are entirely or partly described in IC design information. After routing is complete, the generated wires will be output into the files as well. The database 103 stores the IC design information as well as wires in a compact and efficient manner. The database 103 may, for example, reside on a computer-readable storage device such as a computer memory or a hard drive. The routing engine 104 generates wires (which are then stored in the database 103) that interconnect the nets of an IC design in accordance with the netlist of the IC design. The output subsystem 105 outputs the wiring and other useful information into files of a standard and/or custom format.

Figure 2:
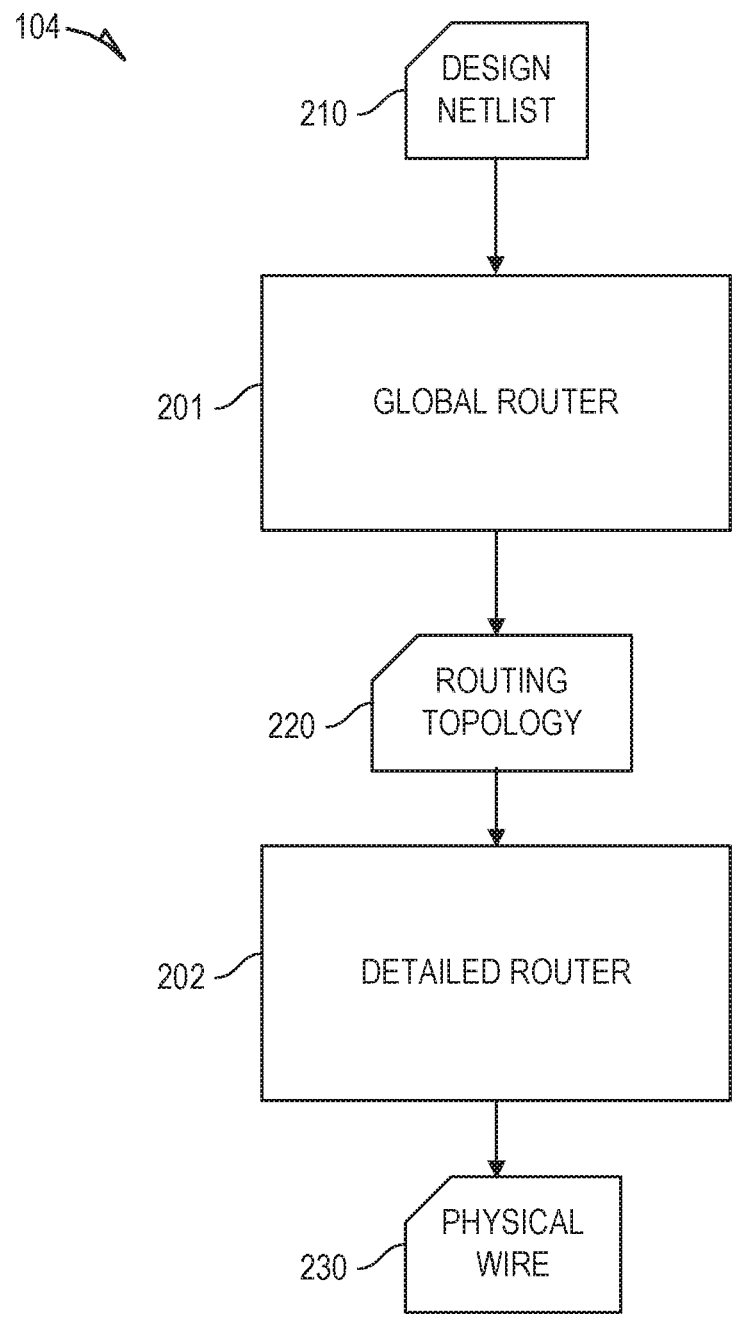
FIG. 2 is a block diagram illustrating functional components of a routing engine, which is provided as part of the router system, according to some example embodiments.

Referring now to FIG. 2, functional components of the routing engine 104 are illustrated, in accordance with some embodiments. To avoid obscuring the inventive subject matter with unnecessary detail, various functional components (e.g., modules, engines, and databases) that are not germane to conveying an understanding of the inventive subject matter have been omitted from FIG. 2. However, a skilled artisan will readily recognize that various additional functional components may be supported by the routing engine 104 to facilitate additional functionality that is not specifically described herein.

Further, any one or more of the functional components illustrated in FIG. 2 and described herein may be implemented using hardware (e.g., a processor of a machine) or a combination of hardware and software. For example, any one of the components described herein may configure a processor to perform the operations described herein for that component. Moreover, any two or more of these components may be combined into a single component, and the functions described herein for a single component may be subdivided among multiple components. Additionally, according to various example embodiments, any of the functional components illustrated in FIG. 2 may be implemented together or separately within a single machine, database, or device or may be distributed across multiple machines, databases, or devices.

As shown, the routing engine 104 comprises a global router 201 and a detailed router 202. A design netlist 210, which is provided as input to the global router 201, specifies connections of pins in one or more nets that may be included in an IC design. The global router 201 is responsible for determining an approximate routing path for wires connecting pins of each net in accordance with the design netlist 210 in a process referred to by those of ordinary skill in the art as "global routing." In doing so, the global router 201 may construct multiple levels, each with a global routing grid covering the entire IC design of one or more layers. At any one moment, only a portion, such as an area of one or more regions, of the design may be routed; therefore, much less memory and run time are required. In addition, since the routing task has been divided, multi-threaded parallelism can be applied to speed up the global router 201.

As shown, the global router 201 receives the design netlist 210 as input. The global router 201 processes the design netlist 210 to generate a routing topology 220 that includes a routing path for each net in the IC design that connects the net's routable elements. Each routing path may include multiple branches, each of which represents a wire that connects two pins. The routing topology 220 includes a topological graph that represents the IC design layout topologically. The topological graph may include a tree structure that includes several topological items including nodes that represent the pins in each net as well as the connections between each pair of pins.

Given the design netlist 210 as input, the global router 201 decomposes multi-pin nets in the design netlist 210 into two-pin nets. During the routing process, the global router 201 applies an entry-aware search algorithm to generate a single-entry-violation-free routing result for each two-pin net. The search algorithm is "entry-aware" in that it penalizes multiple entries into a single partition (e.g., using an adjustment factor).

The routed two-pin nets are combined to assemble the multi-pin net. Although the individual two-pin nets are routed in a manner that does not violate the single-entry constraint, the single-entry constraint may be violated in the routed multi-pin net as a result of combining the two-pin nets. Accordingly, after routing, the global router 201 applies a post fix stage to remove extra entries for the multi-pin nets that violate the single-entry constraint. To fix the single-entry violation for a multi-pin net, a main partition entry is selected, and branches in the routing path that enter partitions at a point other than the selected main entry are ripped up. Next, the global router 201 sets a small routing cost to the selected main entry and the global router 201 applies the entry-aware search algorithm to reroute the ripped-up branches.

Figure 3:
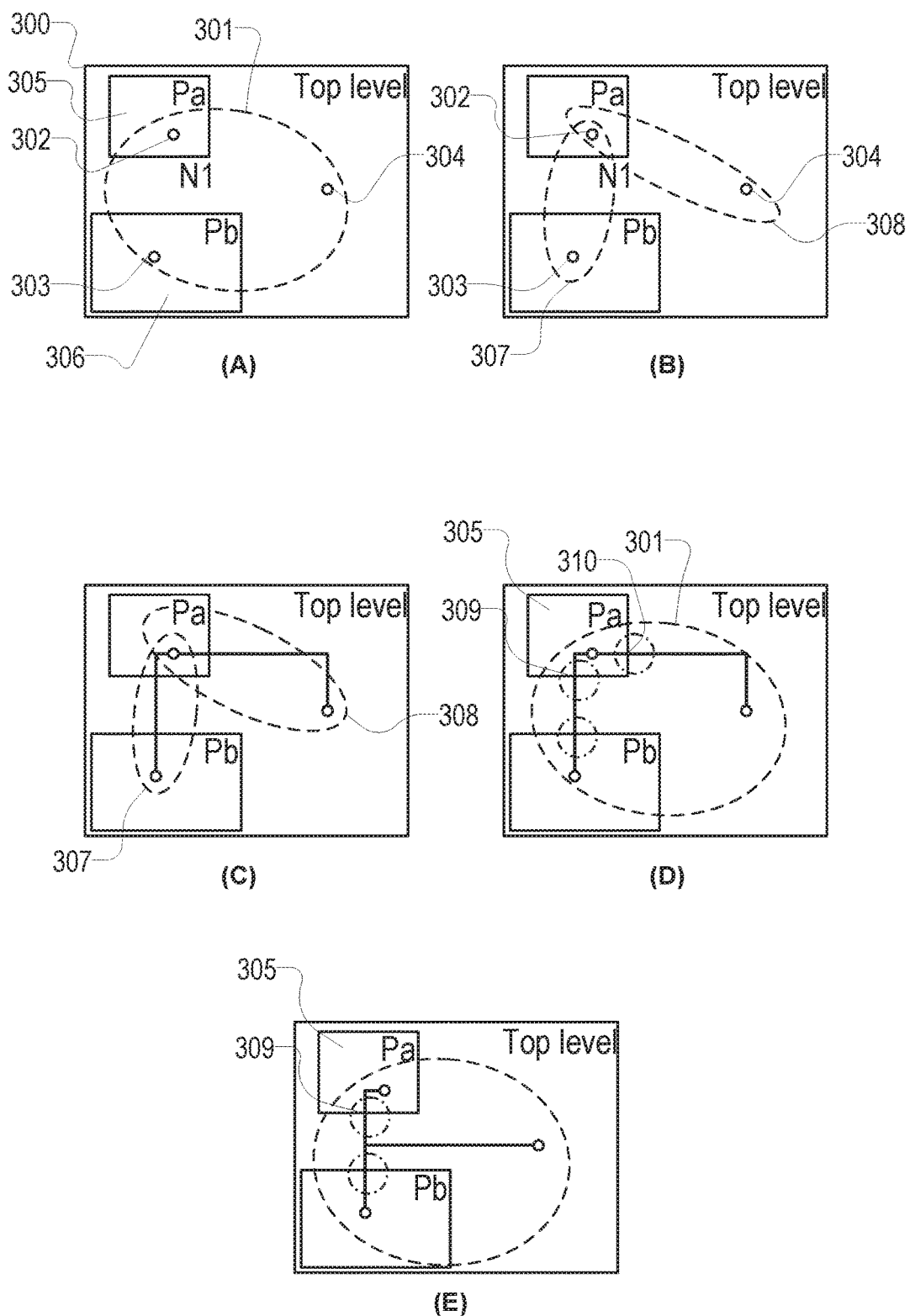
FIG. 3 is a conceptual diagram illustrating a high-level overview of a routing method performed by the routing engine for resolving single-entry constraint violations in IC designs, according to some example embodiments.

As an example, FIG. 3 is a conceptual diagram that illustrates a high-level overview of a routing method performed by the routing engine 104 for resolving single-entry constraint violations in IC designs, according to some example embodiments. Shown at FIG. 3(*a*) is a representation of an IC design 300. The IC design 300 comprises a multi-pin net 301 that includes pins 302-304 and partitions 305 and 306. As shown in FIG. 3(*b*), the multi-pin net 301 is decomposed (e.g., by the global router 201) into two-pin nets 307 and 308. Two-pin net 307 includes pins 302 and 303 and two-pin net 308 includes pins 302 and 304. As shown in FIG. 3(*c*), each of the two-pin nets 307 and 308 are individually routed. As mentioned above, the global router 201 routes the two-pin nets 307 and 308 using an approach based on modifications to the A* search algorithm. In particular, the A* search algorithm is modified to penalize multiple entries into a single partition. As an example of the foregoing, in routing each two-pin net, the global router 201 identifies each possible routing path, and selects, from the possible routing paths, a routing path that minimizes a routing score function that includes an adjustment factor that penalizes partition entries to minimize the partition entry count of the selected route. As shown, the routing paths used to connect two-pin nets 307 and 308 are single-entry-constraint-violation free.

As shown in FIG. 3(*d*), the routed two-pin nets 307 and 308 are combined to once again form the multi-pin net 301. However, although the routing results for the two-pin nets 307 and 308 are single-entry-constraint-violation free, the combination of the two-pin nets 307 and 308 creates multiple single entry constraint violations in the routed multi-pin net 301. For example, the partition 305 includes two entries—entry 309 for the connection between pins 302 and 303 and entry 310 for the connection between pins 302 and 304. Accordingly, as shown in FIG. 3(*e*), the routing paths that violate the single entry constraints are ripped up and rerouted to share a common main entry point, thereby abiding by the single-entry constraint. In particular, the connection of the routing path that entered the partition 305 at entry 310 (e.g., the connection between pins 302 and 304) has been ripped up and rerouted to share the entry 309, which is the main entry selected for the partition 305.

Returning to FIG. 2, the routing topology 220 is passed to the detailed router 202, which generates physical wires 230 that realize the routing topology 220. To generate the physical wires 230 that realize the refined routing topology 220, the detailed router 202 routes the complete design by dividing the entire design into a set of smaller areas and/or partitions. Consistent with some embodiments, the detailed router 202 can route these areas in parallel utilizing multi-threaded parallel computing capabilities. In other embodiments, the detailed routing can be single-threaded all or some of the time, and/or multi-threaded all or some of the time.

Figure 4:
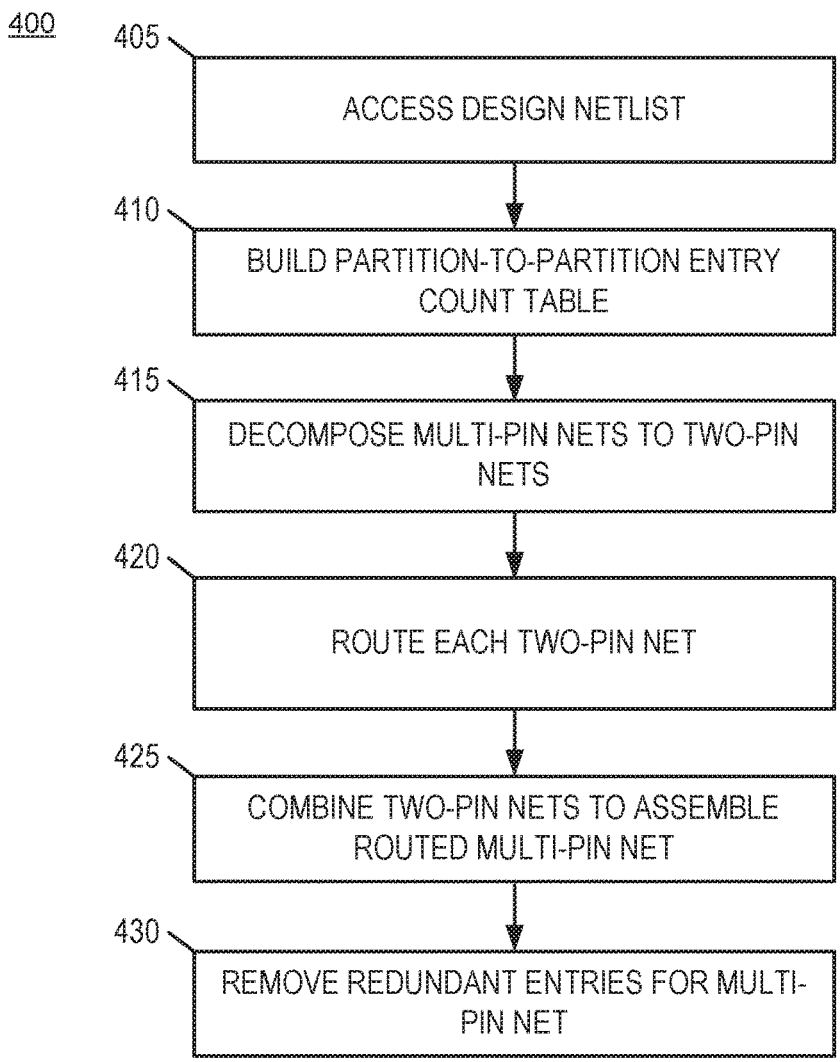
FIGS. 4-7 are flowcharts illustrating operations of the routing engine in performing the method for resolving single-entry constraint violations in IC designs, according to some example embodiments.
Figure 5:
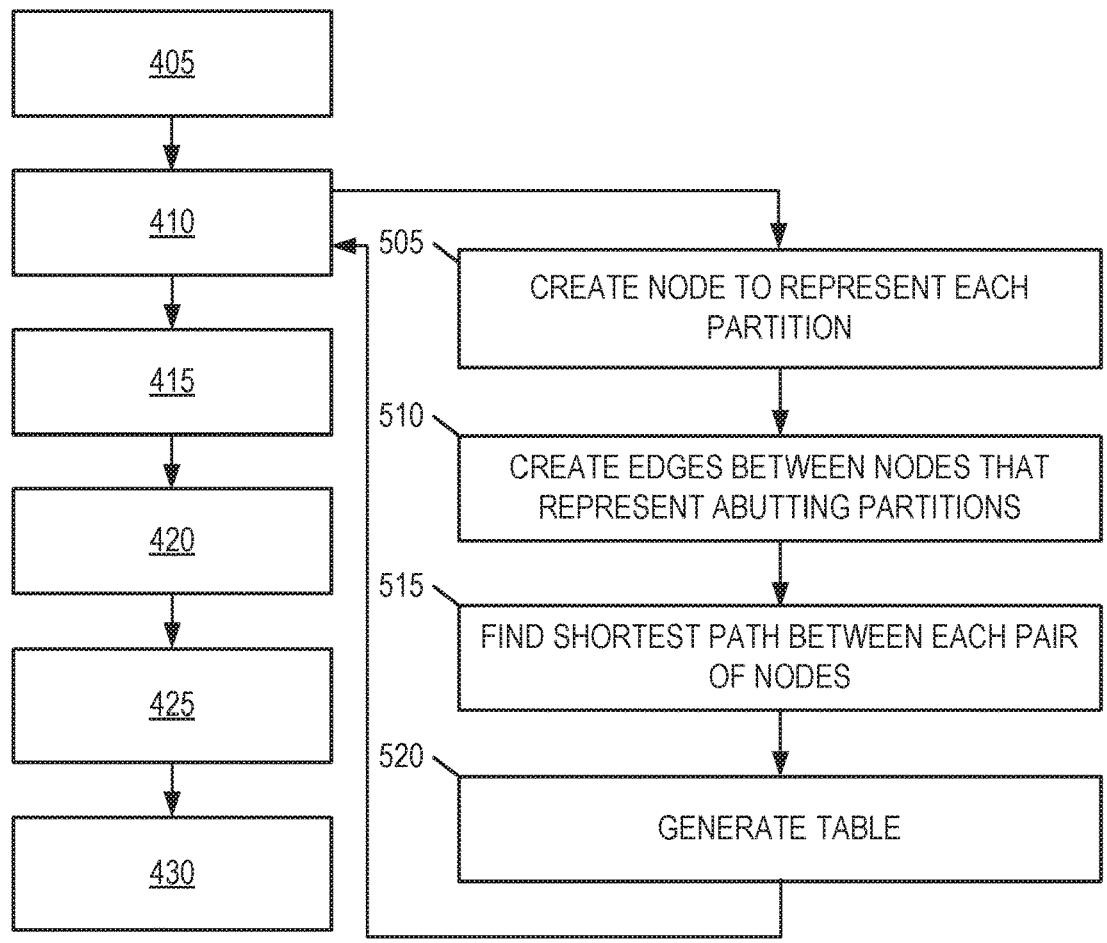
Figure 6:
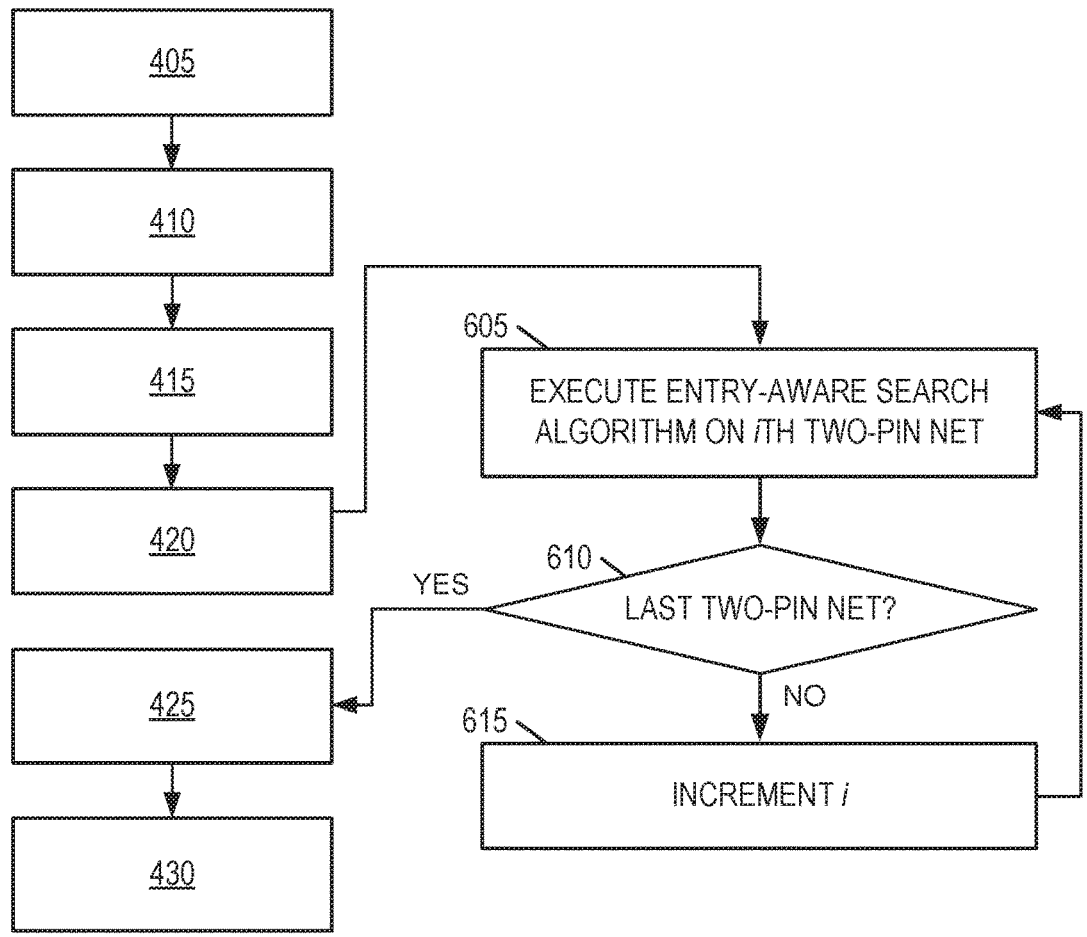

FIGS. 4-6 are flowcharts illustrating operations of the router 100 in performing a method 400 for routing based on an enhanced topology, according to some example embodiments. The method 400 may be embodied in computer-readable instructions for execution by one or more processors such that the operations of the method 400 may be performed in part or in whole by the routing engine 104; accordingly, the method 400 is described below by way of example with reference thereto. However, it shall be appreciated that at least some of the operations of the method 400 may be deployed on various other hardware configurations, and the method 400 is not intended to be limited to the routing engine 104.

At operation 405, the global router 201 accesses design netlist 210 of an IC design. The design netlist 210 identifies at least one multi-pin net, which is a net that includes multiple pins. The design netlist 210 further specifies connections between the multiple pins. The IC design includes two or more partitions, which may include a top level partition.

The global router 201 builds a partition-to-partition entry count table based on the design netlist 210, at operation 410. The partition-to-partition entry count table comprises a count of partition entries in each path that connects each pair of partitions (e.g., the centers of each pair of partitions) in each multi-pin net of the design netlist 210. In building the partition-to-partition entry count table, the global router 201 creates an adjacency graph where each node in the graph represents a partition, and each edge in the graph that connects two nodes designates the corresponding partitions as abutting partitions (e.g., neighboring or overlapping partitions). The global router 201 finds the shortest path between each pair of nodes in the adjacency graph, which in this case corresponds to a minimum number of edges that connect each pair of nodes in the adjacency graph. The global router 201 generates the partition-to-partition entry count table such that, for every node in the adjacency graph, the partition-to-partition entry table specifies the shortest path (e.g., in terms of number of edges) between that node and every other node in the adjacency graph. Further details regarding building of the partition-to-partition entry count table are discussed below in reference to FIGS. 5 and 8.

At operation 415, the global router 201 decomposes each multi-pin net in the design netlist 210 into a plurality of two-pin nets. For example, the global router 201 may decompose a multi-pin net into a plurality of two-pin nets by finding a minimum spanning tree (MST) for the multiple pins in the net, which is a minimum-length tree of edges connecting all the pins. The global router 201 can compute the MST in polynomial time using, for example, the Kruskal or Prim-Dijkstra algorithms.

The global router 201, as shown at operation 420, routes each two-pin net of the plurality of two-pin nets. The global router 201 may route each two-pin net using an approach based on modifications to the A* search algorithm. For example, in routing each two-pin net, the global router 201 identifies each possible routing path and determines a routing score of each possible routing path using a routing score function that includes an adjustment factor that penalizes partition entries. In determining the routing score for each possible routing path, the global router 201 may query the partition-to-partition entry count table to determine the number of partition entries for each path. The routing score function may include or correspond to what those of ordinary skill in the art refer to as a "routing cost function" where "routing costs" may include wire length, time delay, and power consumption. The global router 201 selects, from the possible routing paths, the routing path with the lowest routing score according to the routing score function. In other words, the global router selects the routing path that minimizes the routing score function. Because the routing function includes the adjustment factor that penalizes partition entries, the adjustment factor thereby minimizes the partition entry count of the selected route. Further details regarding the routing of each two-pin net are discussed below in reference to FIG. 6.

The global router 201 combines the routed two-pin nets to assemble routed multi-pin nets (see operation 425). Although individually the routing paths for the two-pin nets includes only a single partition entry, additional partition entries may exist in a routing path of a multi-pin net as a result of combining the two-pin nets. Accordingly, at operation 430, the global router 201 removes redundant partition entries in each multi-pin net. Further details regarding the removal of redundant partition entries are discussed below in reference to FIGS. 7 and 9. Upon removing the redundant partition entries, the routing topology 220 is produced, which is then output by the global router 201.

As shown in FIG. 5, the method 400 may include operations 505, 510, 515, and 520. In some embodiments, the operations 505, 510, 515, and 520 may be performed as part of (e.g., as a subroutine) of operation 410, where the global router 201 builds the partition-to-partition entry count table.

At operation 505, the global router 201 creates a node for each partition in each multi-pin net of the design netlist 210. In this way, each node represents a partition. At operation 510, the global router 201 creates edges between each pair of nodes that represent abutting partitions. Abutting partitions include two neighboring (e.g., proximal) or overlapping partitions. One of ordinary skill in the art may recognize that the operations 505 and 510 result in the creation of an adjacency graph that represents whether pairs of partitions of the multi-pin net are abutting (e.g., neighboring or overlapping).

As shown by way of example at operation 515, the global router 201 finds the shortest path between each pair of nodes in the adjacency graph. In other words, for every node in the adjacency graph, the global router 201 finds the shortest path between that node and every other node in the adjacency graph. In this context, the shortest path between two nodes includes the minimum number of edges that connect the two nodes. To find the shortest path between each pair of nodes in the adjacency graph, the global router 201 may, for example, apply an all-pair shortest path algorithm to the adjacency graph.

As shown, at operation 520, the global router 201 generates a table using values corresponding to the shortest paths between each pair of nodes in the adjacency graph (e.g., corresponding to the minimum number of edges that connect the two nodes). For each node in the adjacency graph, the table specifies a value for the shortest path between that node and every other node in the adjacency graph. By constructing the table in this manner, each entry in the table includes a value for the shortest path between two nodes, which corresponds to a minimum number of partitions entries to connect the two partitions that the two nodes represent. The table generated at operation 520 is the partition-to-partition entry count table.

As shown in FIG. 6, the operation 420 of the method 400, where the global router 201 routes each two-pin net, may include operations 605, 610, and 615, according to some embodiments. In the context of operations 605, 610, and 615, a net counter, i, is used to iteratively process each two-pin net of the plurality of two-pin nets created at operation 415. Initially, i is set to 1.

At operation 605, the global router 201 executes, on the ith two-pin net, an entry-aware search algorithm to route the ith two-pin net. The entry-aware search algorithm may be based on the A* search algorithm with modification to penalize multiple entries. For example, the global router 201 identifies each possible routing path for connecting the two-pin net, and selects, from the possible routing paths, a routing path that minimizes the following routing score function:

Routing Score=$g(s,n)+h(n,t)$

In the above routing score function, $g(s, n)$ is the actual routing score from a source pin, s, to a node, n, in the routing path, and $h(n, t)$ is the estimated routing score from in to a target pin, t. In this context, routing scores may include correspond to routing costs such as wire length or time delay, and thus the actual routing score from s to in may be determined by computing the number of partition entries, congestion, the wire length or timing delay between s and n. The global router 201 may compute $h(n, t)$ as follows:

$h(n,t)$=(manhDis$(n,t)$*wirelengthCost)+(P2PEC(Pa, Pb)*entryCost)

where manhDis(n, t) is the Manhattan distance between n and t; wirelengthCost is a weight applied to manhDis(n, t) to account for wire length routing costs in the routing path; P2PEC(Pa, Pb) is the minimum number of entries from partitions Pa and Pb as captured in the partition-to-partition entry count table, where Pa and Pb are partitions traversed by the routing path; and entryCost is a predefined weight that is applied to P2PEC(Pa, Pb). The product of P2PEC(Pa, Pb) and entryCost is the adjustment factor that penalizes multiple partition entries. Accordingly, in routing a two-pin net, the global router 201 determines the routing score for each possible path by computing the sum of $g(s, n)$ and $h(n, t)$, and the global router 201 selects the routing path with the lowest routing score. The resulting selection is a routing path that includes only a single partition entry, thereby obeying the single-entry constraint.

The global router 201, at operation 610, determines whether the ith two-pin net is the last two-pin net in the plurality of two-pin nets. If, at operation 610, the global router 201 determines there are additional two-pin nets, the global router 201, at operation 615, increments the net counter, i, and returns to operation 605 to route the next two-pin net. If, at operation 610, the global router 201 determines the ith two-pin net is the last two-pin net in the plurality of two-pin nets, the method 400 proceeds to operation 425.

Figure 7:
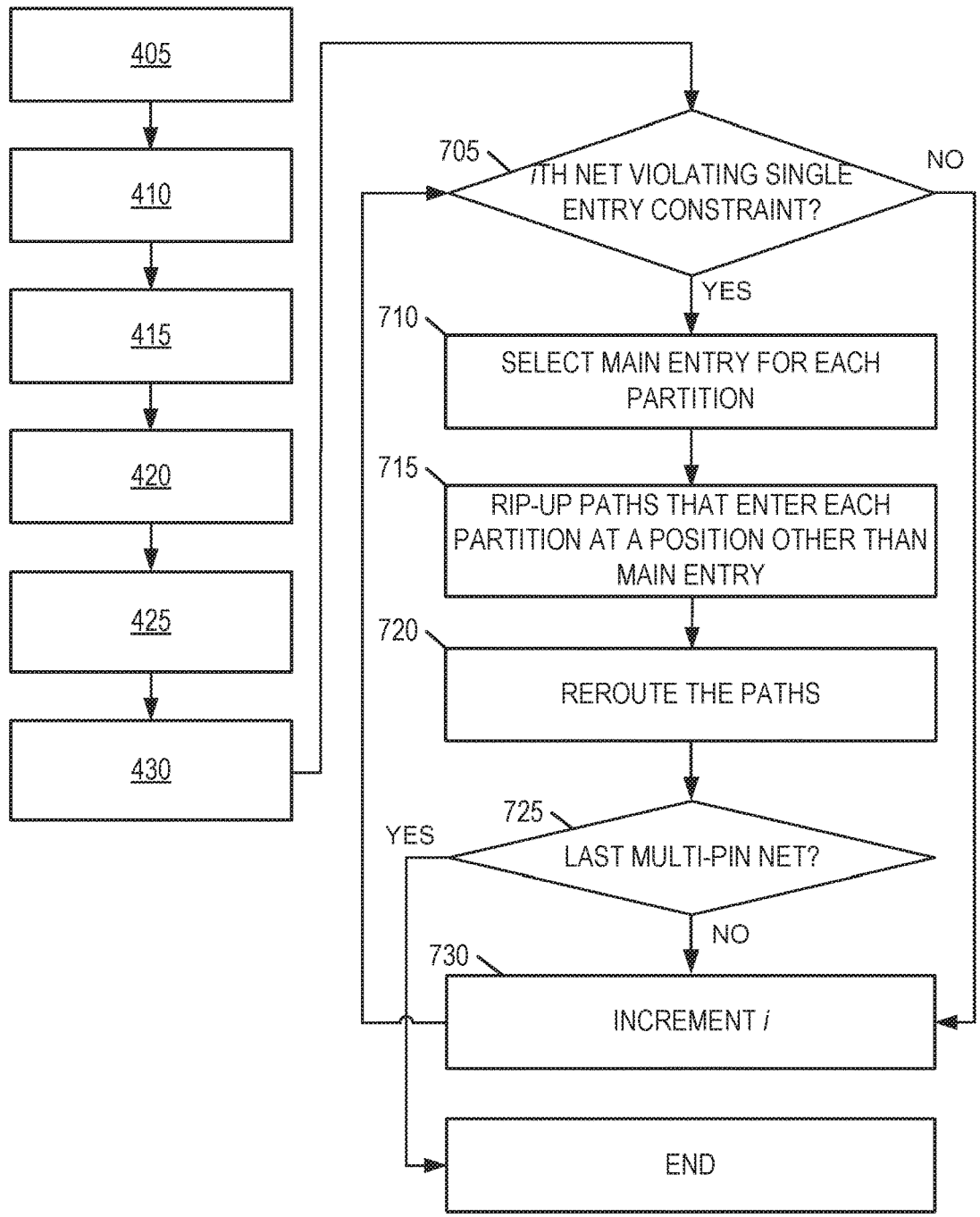

As shown in FIG. 7, the method 400 may include operations 705, 710, 715, 720, 725 and 730, consistent with some embodiments. In some embodiments, the operations 705, 710, 715, 720, 725 and 730 may be performed as part of the operation 430, where the global router 201 removes one or more redundant partition entries from the routed multi-pin net. In the context of operations 705, 710, 715, 720, 725 and 730, a net counter, i, is used to iteratively process each routed multi-pin net in the design netlist 210. Initially, i is set to 1.

At operation 705, the global router 201 determines whether the routing path of the multi-pin net violates a single-entry routing constraint. In other words, the global router 201 determines whether the routing path enters any partition in the multi-pin net more than once. In doing so, the global router 201 may identify one or more partitions having multiple entries.

In response to determining the routing path of the multi-pin net violates a single-entry routing constraint, at operation 710, the global router 201 selects a main entry for each of the one or more partitions in the multi-pin net that have multiple entries. The main entry for a partition may be selected from among the multiple entries. The selection may, for example, be based on a distance between the entry points and the pins connected along the routing path that violates the single-entry routing constraint.

As shown, at operation 715, the global router 201 removes one or more branches of the routing path that enter the one or more partitions at an entry point other than the selected main entry. At operation 720, the global router 201 reroutes the one or more branches of the routing path to enter the one or more partitions at the selected main entry. In rerouting the one or more branches, the global router 201 may execute the A* search algorithm with the multiple entry penalty discussed above in reference to operation 605. The global router 201 may constrain the routing of the one or more branches such that the creation of new partition entries is forbidden or discouraged (e.g., by tuning the adjustment factor that penalizes multiple entries).

The global router 201 determines whether the ith multi-pin net is the last multi-pin net in the design netlist 210 (see operation 725). If, at operation 725, the global router 201 determines there are additional multi-pin nets, the global router 201, at operation 730, increments the net counter, i, and returns to operation 705. If, at operation 725, the global router 201 determines the ith multi-pin net is the last multi-pin net in the design netlist 210, the method 400 ends.

Figure 8:
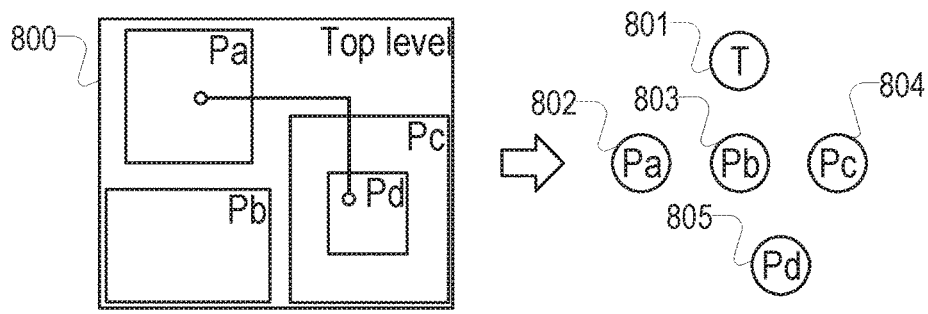
FIG. 8 is a conceptual diagram that graphically illustrates an operation of building a partition-to-partition entry count table, which may be performed as part of the method for resolving single-entry constraint violations in IC designs, according to some example embodiments.
Figure 8:
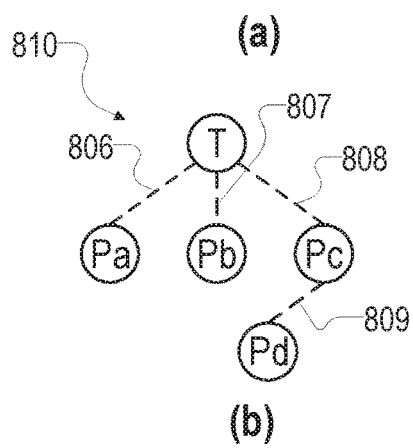
Figure 8:
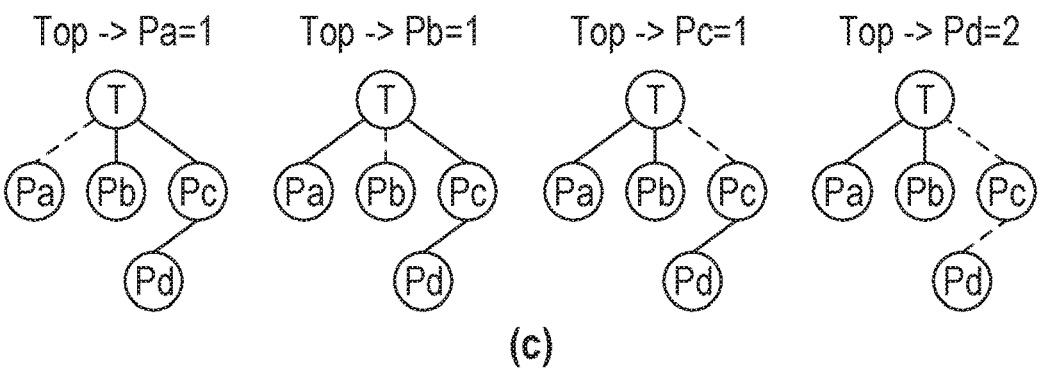

FIG. 8 is a conceptual diagram that graphically illustrates the operation 410 of the method 400, where the global router 201 builds a partition-to-partition entry count table, according to some example embodiments. In FIG. 8(a), an IC design 800 is illustrated as comprising a top level partition and partitions Pa, Pb, Pc, and Pd. As shown in FIG. 8(a), nodes 801-805 are created (e.g., by the global router 201 at operation 505) to represent the top level and partitions Pa, Pb, Pc, and Pd. As shown in FIG. 8(b), edges 806-809 are created (e.g., at operation 510) between node pairs that represent abutting partitions, which results in the creation of adjacency graph 810. As an example, in the IC design 800 partition Pa and the top level are abutting (Pa is wholly within the top level), and thus, the edge 806 is created between node 801, which represents the top level, and node 802, which represents Pa, to represent this relationship. As another example, in the IC design 800, partitions Pc and Pd are overlapping (Pd is wholly within Pc) and thus, the edge 809 is created between nodes 804, which represents Pc, and node 805, which represents Pd, to represent this relationship.

As shown in FIG. 8(c), a value for the shortest path between each pair of nodes in the adjacency graph 810 is determined (e.g., by the global router at operation 515). The shortest path between each pair of nodes is determined in terms of the number of edges between node pairs. For example, two edges—808 and 809—separate nodes 801 and 805, and thus, the value for the shortest path between nodes 801 and 805 is 2. As shown in FIG. 8(d), the value for the shortest path between each node pair is used (e.g., by the global router 201 at operation 520) to generate a partition-to-partition entry count table 820. The partition-to-partition entry count table 820 includes the value for the shortest path between each node and every other node in the adjacency graph 810. By constructing the partition-to-partition entry count table 820 in this manner, the values in the table represent the minimum number of partition entries in a routing path that connects the corresponding pair of partitions.

Figure 9:
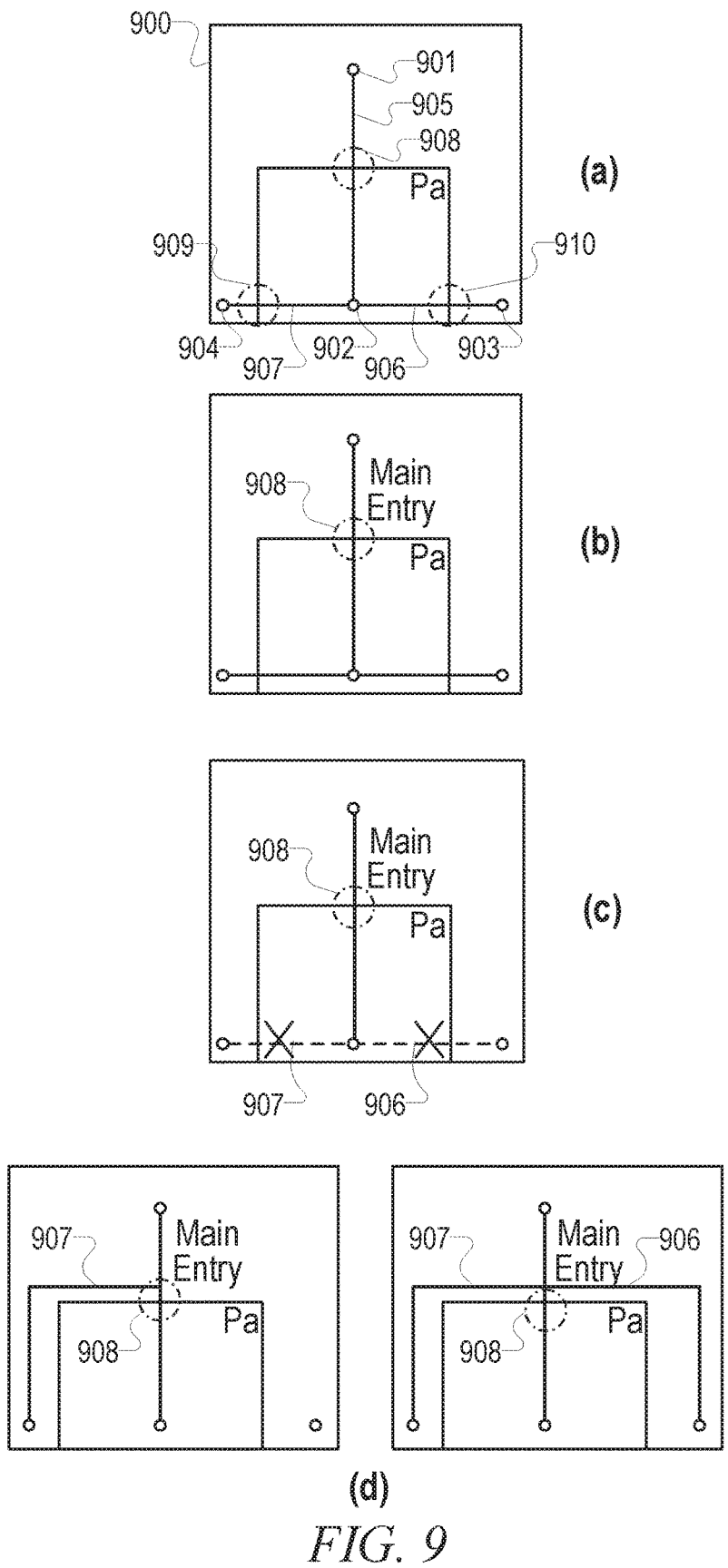
FIG. 9 is a conceptual diagram that graphically illustrates an operation of removing redundant entries for multi-pin nets, which may be performed as part of the method for resolving single-entry constraint violations in IC designs, according to some example embodiments.

FIG. 9 is a conceptual diagram that graphically illustrates operation 430 of the method 400, where the global router 201 removes redundant entries for multi-pin nets, according to some example embodiments. A graphical representation of an IC design 900 that includes a routed multi-pin net is shown in FIG. 9(a). The multi-pin net comprises pins 901-904. The IC design also includes a partition Pa. The pins 901-904 of the multi-pin net are connected by a routing path that comprises: branch 905 that connects pins 901 and 902, branch 906 that connects the pin 902 to the pin 903; and branch 907 that connects pin 902 to pin 904. As shown in FIG. 9(a) the routing path that connects the pins 901-904 has multiple entries to the partition Pa. Specifically, the routing path enters the partition Pa at entry points 908-910. Thus, the routing path of the multi-pin net 900 violates the single-entry constraint.

As shown in FIG. 9(b), in response to determining the routing path of the multi-pin net 900 violates the single-entry constraint (e.g., at operation 705), the entry point 908 is selected as the main entry for the partition Pa (e.g., at operation 710 by the global router 201). Further, as shown in FIG. 9(c), the branches 906 and 907, which do not enter the partition Pa at the main entry (i.e., entry point 908), are removed from the routing path (e.g., by the global router 201 at operation 715). As shown in FIG. 9(d), the branches 906 and 907 are rerouted (e.g., at operation 720 by the global router 201) to share the main entry of the partition Pa (i.e., entry point 908).

Figure 10:
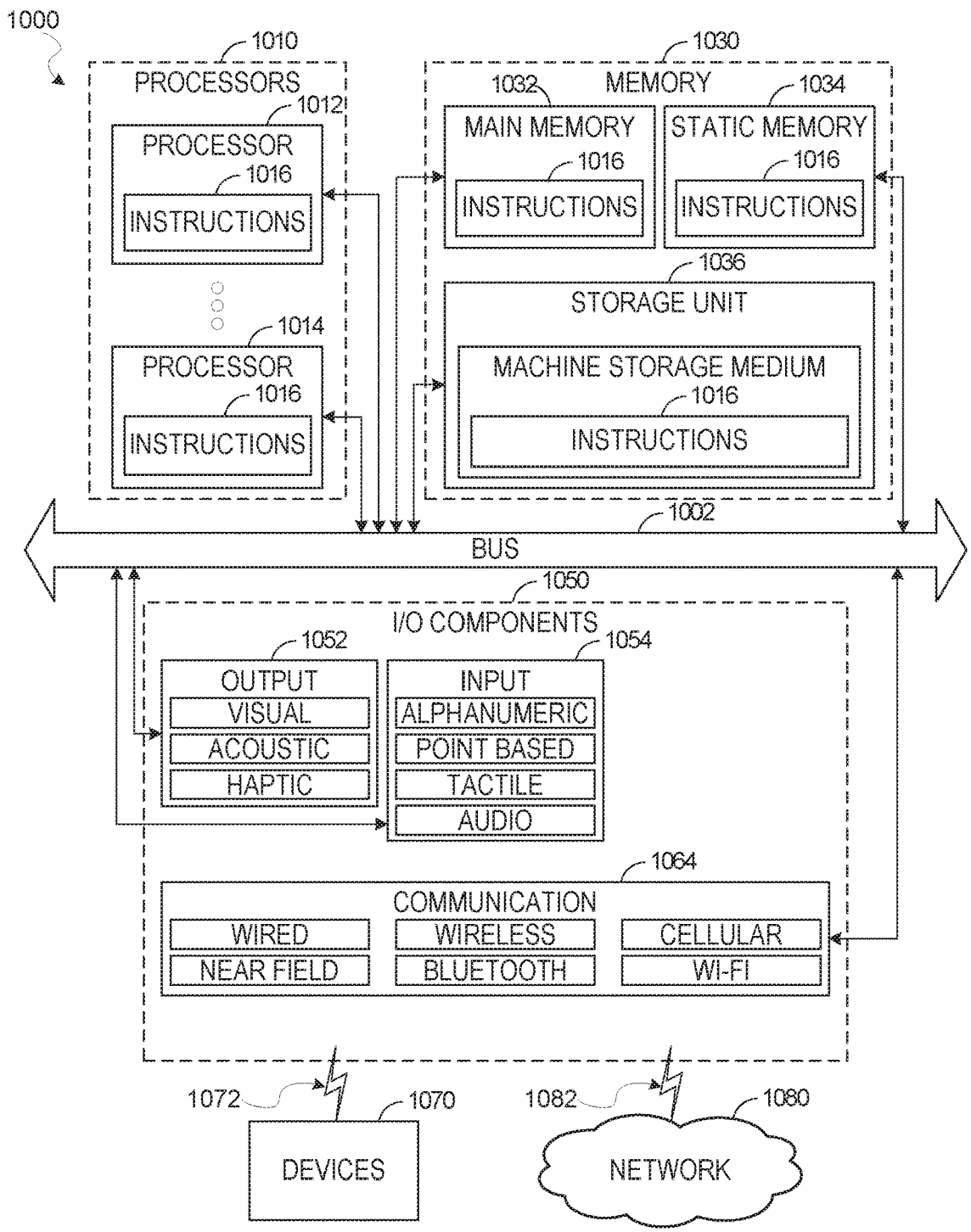
FIG. 10 is a diagrammatic representation of a machine in the example form of a computer system within which a set of instructions for causing the machine to perform any one or more of the methodologies discussed herein may be stored and executed.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute the method 400. Additionally, or alternatively, the instructions 1016 may implement FIGS. 1-3. The instructions 1016 transform the general, non-programmed machine 1000 into a particular machine 1000, such as the routing engine 104, programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, both accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. The devices 1070 may be another machine or any of a wide variety of peripheral devices (e.g., a peripheral device coupled via a universal serial bus (USB)).

Executable Instructions and Machine Storage Medium

The various memories (e.g., 1030, 1032, 1034, and/or memory of the processor(s) 1010) and/or the storage unit 1036 may store one or more sets of instructions and data structures (e.g., software) embodying or utilized by any one or more of the methodologies or functions described herein. These instructions (e.g., instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors of a machine; and
   a machine storage medium storing instructions, which when executed by the machine, cause the machine to perform operations comprising:
   accessing a design netlist of an integrated circuit (IC) design, the design netlist identifying a multi-pin net and specifying connections between pins included in the multi-pin net, the IC design having two or more partitions;
   building a partition-to-partition entry count table based on the design netlist, the partition-to-partition entry count table comprising a plurality of minimum partition entry values, each minimum partition entry value corresponding to a pair of partitions in the IC design;
   decomposing the multi-pin net into a plurality of two-pin nets;
   routing each two-pin net of the plurality of two-pin nets, the routing of each two-pin net including selecting, from among a plurality of possible routing paths, a routing path that minimizes a routing score function that includes an adjustment factor that penalizes partition entries, the adjustment factor being based in part on a minimum partition entry value of a pair of partitions transgressed by the plurality of possible routing paths, the selected routing path for each of the two-pin nets having a single partition entry; and
   reassembling the multi-pin net by combining the routed two-pin nets, the reassembling of the multi-pin net yielding a routed multi-pin net.

2. The system of claim 1, further comprising removing one or more redundant partition entries in the routed multi-pin net.

3. The system of claim 2, wherein the removing of the one or more redundant entries in the routed multi-pin net comprises:

determining the routed multi-pin net violates a single-entry routing constraint;
selecting a main entry for at least one of the two or more partitions in the multi-pin net;
removing one or more branches of a routing path that enter the at least one of the two or more partitions at an entry point other than the main entry; and
rerouting the one or more branches to enter the at least one of the two or more partitions at the main entry.

4. The system of claim 1, wherein the building of the partition-to-partition entry count table comprises:
generating an adjacency graph that represents the two or more partitions, the adjacency graph including a plurality of nodes and one or more edges, each node of the plurality of nodes representing a partition, each of the one or more edges connecting two nodes that represent abutting partitions;
for each node in the adjacency graph, finding a shortest path between the node and each other node in the adjacency graph; and
generating the partition-to-partition entry count table such that each entry in the partition-to-partition entry count table comprises a value corresponding to a shortest path between two nodes in the adjacency graph.

5. The system of claim 4, wherein the generating of the adjacency graph comprises:
for each partition of the two or more partitions, creating a node that represents the partition; and
for each pair of abutting partitions of the two or more partitions, creating an edge between two nodes that correspond to the pair of abutting partitions.

6. The system of claim 4, wherein finding the shortest path between the node and each other node in the adjacency graph comprises applying an all-pair shortest path algorithm to the adjacency graph.

7. The system of claim 1, wherein the decomposing the multi-pin net into a plurality of two-pin nets comprises finding a minimum spanning tree for the multi-pin net, the minimum spanning tree being a minimum-length tree of edges connecting multiple pins.

8. The system of claim 1, wherein the routing score function includes:
an actual routing score between a first pin in a two-pin net and a route node, and
an estimated routing score between the route node and a second pin in the two-pin net, the actual routing score and the estimated routing score including the adjustment factor that penalizes multiple partition entries.

9. The system of claim 1, wherein the minimum partition entry value corresponds to a minimum number of partition entries in a path that connects the pair of partitions.

10. A computerized method comprising:
accessing, using one or more hardware processors, a design netlist of an integrated circuit (IC) design, the design netlist identifying a multi-pin net and specifying connections between pins included in the multi-pin net, the IC design having two or more partitions;
decomposing, using the one or more hardware processors, the multi-pin net into a plurality of two-pin nets;
routing each two-pin net of the plurality of two-pin nets, the routing of each two-pin net including:
identifying a plurality of possible routing paths;
determining, for each of the possible routing paths, a routing score based in part on a number of partition entries in the routing path;
selecting, from among the plurality of possible routing paths, a routing path based on the routing scores of the plurality of possible routing paths, the selected routing path for each of the two-pin nets having a single partition entry;
reassembling, using the one or more hardware processors, the multi-pin net by combining the routed two-pin nets, the reassembling of the multi-pin net yielding a routed multi-pin net; and
in response to determining that the routed multi-pin net violates a single-entry routing constraint, removing one or more redundant partition entries from the routed multi-pin net.

11. The method of claim 10, further comprising:
building a partition-to-partition entry count table based on the design netlist, the partition-to-partition entry count table comprising, for each pair of partitions in the multi-pin net, a minimum partition entry value;
wherein the routing score function includes an adjustment factor that penalizes partition entries, the adjustment factor being based in part on a minimum partition entry value of a pair of partitions transgressed by the plurality of possible routing paths.

12. The method of claim 11, wherein the building of the partition-to-partition entry count table comprises:
generating an adjacency graph that represents the two or more partitions, the adjacency graph including a plurality of nodes and one or more edges, each node of the plurality of nodes representing a partition, each of the one or more edges connecting two nodes that represent abutting partitions;
for each node in the adjacency graph, finding a shortest path between the node and each other node in the adjacency graph; and
generating the partition-to-partition entry count table such that each entry in the partition-to-partition entry count table comprises a value corresponding to a shortest path between two nodes in the adjacency graph.

13. The method of claim 12, wherein the generating of the adjacency graph comprises:
for each partition of the two or more partitions, creating a node that represents the partition; and
for each pair of abutting partitions of the two or more partitions, creating an edge between two nodes that correspond to the pair of abutting partitions.

14. The method of claim 12, wherein finding the shortest path between the node and each other node in the adjacency graph comprises applying an all-pair shortest path algorithm to the adjacency graph.

15. The method of claim 11, further comprising determining that the routed two-pin net violates the single-entry routing constraint based on determining that a routing path of the routed multi-pin net enters at least one of the or more partitions more than once.

16. The method of claim 10, wherein the decomposing the multi-pin net into a plurality of two-pin nets comprises finding a minimum spanning tree for the multi-pin net, the minimum spanning tree being a minimum-length tree of edges connecting multiple pins.

17. The method of claim 10, wherein the removing of the one or more redundant entries in the routed multi-pin net comprises:
selecting a main entry for at least one of the two or more partitions in the multi-pin net;
removing one or more branches of a routing path that enter the at least one of the two or more partitions at an entry point other than the main entry; and
rerouting the one or more branches to enter the at least one of the two or more partitions at the main entry.

18. The method of claim 10, further comprising determining that the routed two-pin net violates the single-entry routing constraint based on determining that a routing path of the routed multi-pin net enters at least one of the or more partitions more than once.

19. The method of claim 10, wherein the routing score function includes:
- an actual routing score between a first pin in the two-pin net and a route node; and
- an estimated routing score between the route node and a second pin in the two-pin net, the actual routing score and the estimated routing score including an adjustment factor that penalizes multiple partition entries.

20. A system comprising:
- one or more processors of a machine; and
- a machine storage medium storing instructions, which when executed by the machine, cause the machine to perform operations comprising:
- building a partition-to-partition entry count table based on an integrated circuit (IC) design that includes two or more partitions, the partition-to-partition entry count table comprising, for each pair of partitions in the net, a minimum partition entry value;
- decomposing the multi-pin net into a plurality of two-pin nets;
- routing each two-pin net of the plurality of two-pin nets based on the minimum partition entry value of each pair of partitions in the multi-pin net included in the partition-to-partition entry count table, the routing of each two-pin net including selecting, from among a plurality of possible routing paths, a routing path that minimizes a routing score function that includes an adjustment factor that penalizes partition entries, the selected routing path including a single partition entry;
- reassembling the multi-pin net by combining the routed two-pin nets, the reassembling of the multi-pin net yielding a routed multi-pin net; and
- removing one or more redundant partition entries in the routed multi-pin net.

\* \* \* \* \*